Dec. 19, 1939.   H. W. ZIMMERMAN   2,183,633
TORQUE MEASURING WRENCH
Filed April 12, 1937
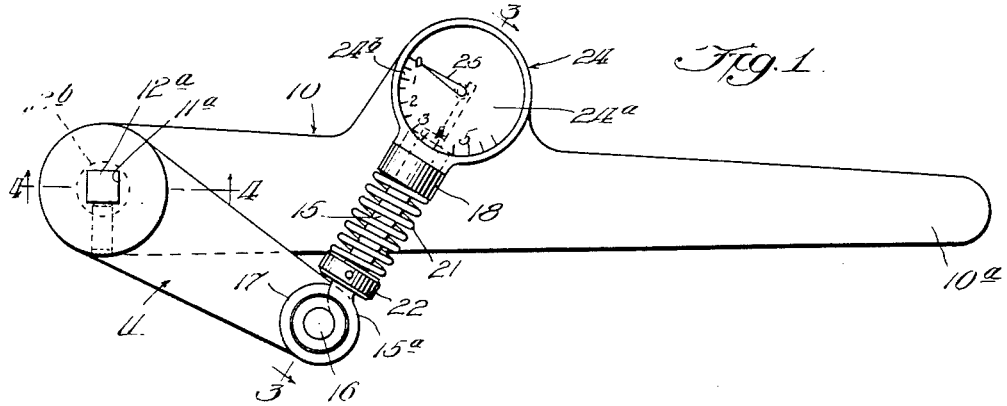
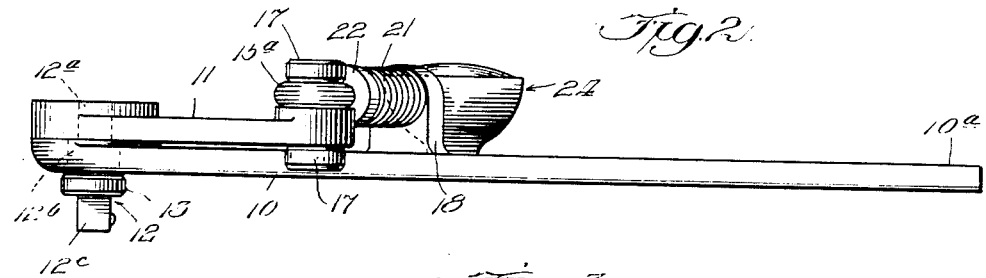
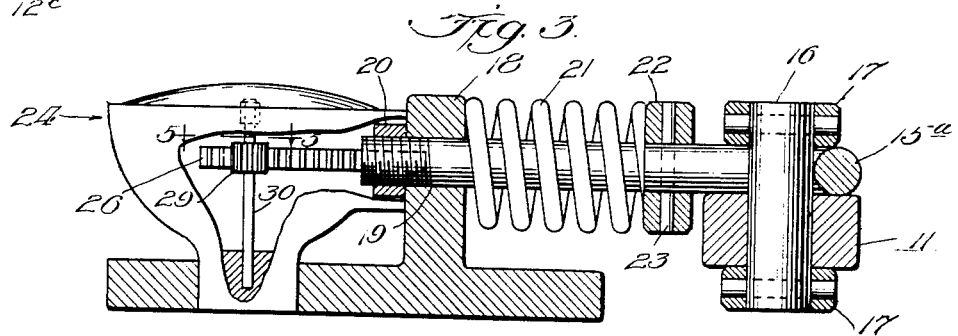
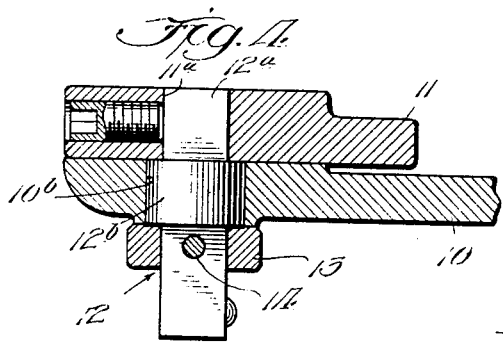
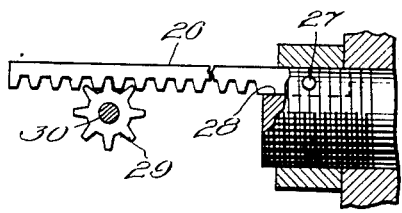
Inventor:
Herman W. Zimmerman
by Davis, Lindsey, Smith & Shonts
attys ns
Patented Dec. 19, 1939

2,183,633

UNITED STATES PATENT OFFICE 2,183,633

TORQUE MEASURING WRENCH

Herman W. Zimmerman, Highland Park, Ill., assignor, by mesne assignments, to Frederick G. Wacker and Grace J. Wacker, Lake Forest, Ill.

Application April 12, 1937, Serial No. 136,308

10 Claims. (Cl. 265—1)

My invention relates to wrenches and it has to do more particularly with a wrench for measuring the force or torque applied thereto in tightening nuts, bolts, studs, and the like.

One of the objects of my invention is to provide an improved torque measuring wrench.

Another object is to provide an improved wrench of the above character which is of simple, inexpensive and sturdy construction and which is adapted to accurately measure the force or torque applied therethrough.

A further object is to provide a wrench of the foregoing character embodying a novel arrangement of parts including a pair of relatively rotatable arms, one of which is provided with a handle portion and the other of which is adapted for connection with the work, and wherein such arms are connected by an adjustable link and spring mechanism operatively connected with an indicating device adapted to register the relative rotation of the arms (and force of torque applied to the work through the wrench) in terms of inch-pounds pressure.

Other objects and advantages will become apparent as this description progresses, and by reference to the drawing wherein—

Figure 1 is a top plan view of one form of wrench structure embodying my invention;

Fig. 2 is a side elevational view of the structure of Fig. 1;

Fig. 3 is an enlarged sectional view taken substantially on the line 3—3 of Fig. 1;

Fig. 4 is an enlarged sectional view taken substantially on the line 4—4 of Fig. 1; and Fig. 5 is a section taken substantially on the line 5—5 of Fig. 3.

The wrench shown in the drawing includes a pair of rotatably connected arms 10 and 11. Arm 10 is the longer, and it is provided, at its rear end, with a handle portion 10$^a$ adapted to be grasped by the hand of the operator. The arms 10 and 11 are rotatably connected together by a member 12 having a shank part 12$^a$ (rectangular or other irregular cross-section, to prevent rotation) fixedly secured in an opening 11$^a$ in the forward end of the arm 11. The member 12 is further provided with an enlarged central, circular portion 12$^b$ which is rotatably received in an opening 10$^b$ in the forward end of the arm 10. The circular part 12$^b$ of member 12 has a squared (or other irregularly shaped) adapter part 12$^c$ depending therefrom which receives a collar 13 secured thereto by a pin 14 for fixing the arms 10 and 11 together for relative rotation without displacement along the axis of rotation.

The adapter part 12$^c$ projects beyond the collar 13 and it is adapted to receive any suitable adapter device for connecting the wrench to the work to be tightened. It will be seen from the foregoing that the arm 11 is directly connected to the work. In carrying out my invention, the arm 10 is connected to the work through the arm 11 and this is accomplished by torque measuring means embodying adjustable link and spring mechanism that will now be described.

As will be noted from Fig. 1 of the drawing, the arm 11 is disposed normally in angular relation to the arm 10, and these arms are connected together and held in this angular relation by a link member 15. One end of the link 15 is provided with an eye portion 15$^a$ pivotally connected to the rear end of the arm 11 by a pin 16 which is secured in place by collar and pin units 17 located at opposite ends of the pin so as to confine the link 15 and arm therebetween. The link 15 projects toward the arm 10 and is slidably supported thereon by a slide bearing which takes the form of an upstanding part 18 on the arm 10 that has an opening 19 therein slidably receiving the adjacent end portion of the link 15. The bearing part 18 is so located that the axis of the link is preferably located at substantially right angles to the median line of the arm 11 so that the initial thrust, at least, transmitted therethrough from the arm 10 to the arm 11 will be at substantially right angles to the latter. The link 15 is secured against displacement from the bearing part 18 by a nut 20 on the threaded end thereof, which passes through and beyond the bearing part 18. This nut also serves an adjustment function which will be referred to more particularly hereinafter.

The mechanism connecting arms 10 and 11 further includes a spring 21 surrounding the link 15 intermediate the bearing part 18 and the arm 11. To confine the spring 21 within definite limits and to avoid interference with the desired free pivoting action between the link 15 and the arm 11, a collar 22 is secured by a pin 23 to the link 15 slightly inward from eye 15$^a$ of the link. The collar 22 is so positioned, and the spring 21 is of such length, that the opposite ends of the spring abut the part 18 and the collar 22 and are confined therebetween, preferably, in a predetermined, slightly compressed condition so that a predetermined initial pressure must be applied thereto in order to begin compression of the same. It will be clear that, in the use of the structure just described, the force or torque applied to the arm 10 is transmitted to the arm 11 and to the work through the spring 21. The spring 21 opposes relative rotational movement between the arms 10 and 11 until the work offers such resistance that the force or torque applied to the arm 10 is such as to overcome the initial tension of the spring 21 so as to compress the same, the extent of compression, and the extent of relative rotation being determined by the force applied as required by the resistance offered by the work.

In tightening various kinds of nuts, bolts, studs, or other kinds of work, it is desirable to avoid the application of such force thereto as might result in breakage thereof, as may be done when the work is set up too tight. Or, in some instances, as in setting up the cylinder head studs of an automotive engine, it may be desirable to accurately set up each and every stud to the same extent to avoid warping and other objectionable conditons in the tightening cylinder head which tend to result in lowered engine operating efficiency. My invention takes care of the foregoing conditions and enables the operator to determine accurately the amount of pressure being applied to the work when any particular piece of work is set up to the desired or prescribed extent. To this end, I employ a pressure gage 24 having a dial 24ᵃ and a gage hand 25 movable relative to a scale 24ᵇ calibrated to register, preferably, in units of 100 inch-pounds pressure. The gage hand is connected to the link 15, which, obviously, is moved relative to the gage 24 or back and forth in the bearing part 18, as the arms 10 and 11 rotate relative to each other. Specifically, the connection between the hand 25 and link 15 includes a rack 26 having one end secured, as by a pin 27, within a slot 28 in the threaded end portion of the link 15 which projects through the bearing part 18. The slot 28 is of sufficient depth to fully receive the rack 26 so that the nut 20 may readily be applied thereover as indicated in Figs. 3 and 5. The rack projects into the gage 24, where it operatively engages a pinion 29 rotatably supported by a shaft 30 which projects upwardly through the gage dial 24ᵃ and fixedly receives the gage hand 25.

In the use of this structure, a proper adapter device (not shown) is detachably applied to the adapter element 12 on the arm 11 and the adapter device is applied to the work. The wrench arm 10 is then rotated in clockwise direction (as viewed in Fig. 1) to tighten the work. When the resistance offered by the work requires the application of sufficient force to compress the spring 21, the arms 10 and 11 will rotate relatively toward each other, and the link 15 and rack 26 will be projected toward the gage actuating the pinion to move the gage hand in counter-clockwise direction. Since the gage scale 24ᵇ is calibrated to indicate this displacement action in terms of inch-pounds pressure, the operator, by observing the scale, may readily determine the amount of pressure that is being applied to the particular piece of work. It is desirable, from the standpoint of accuracy, that the spring 21, at least in the initial manufacture of the same, be set to require a predetermined pressure to effect its initial compression; and, to this end, the nut 20 on the threaded end of the link 15 may be adjusted one way or the other to accurately accomplish this purpose and so that the gage hand 25 may be definitely set to assume the zero position on the scale 24ᵇ when the tool is at rest and before the spring 21 is compressed. In this way any slight manufacturing inaccuracies in the spring 21 may be accommodated, greatly facilitating the manufacture of a tool embodying this invention. Also, if, for any reason, in use the tool should get out of adjustment, it may be accurately adjusted by the manipulation of the nut 20, as stated.

It is believed that the advantages of my invention will be well understood from the foregoing; and it is to be understood that, although I have shown and described only one form of device embodying the invention, changes in details and arrangements of parts may be resorted to without departing from the spirit and scope of the invention as defined by the claims that follow.

I claim:

1. A torque measuring wrench comprising a pair of arms, means adapted for engagement with the work and also for rotatably connecting said arms at one end thereof, and means connecting said arms for measurement of the force or torque applied therethrough to the work including a link member pivotally connected at one end to one of said arms and slidably connected at its other end to the other of said arms, spring means between said two arms and associated with said link member and yieldably opposing movement of said arms toward each other, and means connected to said link member for indicating the extent of compression of said spring means and extent of movement of said two arms toward each other in terms of pressure.

2. A torque measuring wrench comprising a pair of arms, means adapted for engagement with the work and also for rotatably connecting said arms at one end thereof, and means connecting said arms for measuring the force or torque applied therethrough to the work including a link member pivotally connected at one end to one of said arms and slidably connected at its other end to the other of said arms, spring means between said two arms and associated with said link member and yieldably opposing movement of said arms toward each other, means associated with said link member and said other arm for varying the effective length of said link member and for placing said spring means under greater or lesser initial tension, and means for indicating the extent of compression of said spring means and extent of movement of said two arms toward each other in terms of pressure.

3. A torque measuring wrench comprising a pair of arms rotatably connected together at one end thereof, one of said arms having provision on its axis of rotation for rigid engagement with the work, means further connecting said arms in such a way as to yieldably oppose movement of the same toward each other including a link member pivotally connected at one end to one of said arms and slidably engaged at its other end with the other of said arms, means carried by said link member limiting the extent of separation of said arms, spring means carried by said link member between said arms yieldably holding said arms apart to their limited extent and yieldably opposing movement of the same toward each other, and means carried by the slidably engaged arm and connected to and controlled by movement of said link member relative to said slidably engaged arm for indicating relative movement of said arms in terms of pressure.

4. A torque measuring wrench comprising a pair of arms rotatably connected together at one end thereof, one of said arms having means adapted for rigid engagement with the work and also for rotatably connecting said arms, means further connecting said arms in such a way as to yieldably oppose movement of said arms toward each other and to also limit the extent of movement of said arms away from each other including a link member pivotally connected at one end to one of said arms and slidably engaged at its other end with the other of said arms, spring means between said arms and yieldably holding the same in a fully separated position as permitted by the effective length of said link member and also yieldably opposing movement of the arms toward each other, means associated with said link member and the arm with which it is slidably engaged for varying the effective length of said link member and for adjusting the initial tension of said spring means, and means controlled by movement of said link member relative to its slidably engaged arm for indicating relative movement of said arms in terms of pressure.

5. A torque measuring wrench comprising a pair of arms rotatably connected together at one end thereof, one of said arms having means for rigid engagement with the work, which means includes a part adapted for rotatably supporting the other of said arms, and means for operatively connecting said other of said arms with the work through said one arm including a member pivotally connected to said one arm and slidably engaged with said other arm, stop means carried by said member and adapted to engage the other of said arms for limiting the extent of rotation of said arms away from each other, means yieldably opposing extent of rotation of said arms toward each other from their limit of rotation away from each other, and means controlled by movement of said member relative to said other arm for indicating the amount of relative movement of said member and other arm in terms of pressure applied through said other arm to the work.

6. A torque measuring wrench comprising a pair of arms rotatably connected together at one end, one of said arms having means for rigid engagement with the work, which means includes a part for rotatably connecting said arms, and means for operatively connecting the other of said arms with the work through said one arm including a member pivotally connected to said one arm and slidably engaged with said other arm, stop means on said member adapted to engage the other of said arms for limiting the extent of rotation of said arms away from each other, means yieldably opposing rotation of said arms toward each other from their limit of rotation away from each other, and means controlled by movement of said member relative to said other arm for indicating the amount of relative movement of said member and other arm in terms of pressure applied through said other arm to the work, said stop means being adjustable along said member to vary the limit of movement of said arms away from each other and to vary the initial tension of said yieldable means.

7. A torque measuring wrench comprising one arm having an opening in its forward end, a bearing-and-work adapted member having a part non-rotatably and detachably secured in the opening of said one arm, having a bearing part, and a part adapted for reception of work-engaging means, a second arm having an opening in its forward end in which the bearing part of said member is received for rotatably connecting said arms, means carried by said member for preventing separation of said arms along their axis of rotation by the said member, and link and spring mechanism between said arms limiting the extent of relative rotation away from each other and also yieldably opposing extent of relative rotation toward each other, said means including a spring member and an adjustable link device by which the extent of separation of said arms is limited and by which the initial compression of said spring is varied, and means for measuring in terms of pressure the extent of relative movement of said arms toward each other when the wrench is applied to the work and force or torque is applied to one of said arms through said mechanism to the other of said arms to the work.

8. A torque measuring wrench comprising a pair of arms rotatably connected together at one end thereof, one of said arms having provision for rigid engagement with the work, and torque measuring means for connecting said arms in such a way that the force applied to the other of said arms is transmitted through the torque measuring means to said one arm and to the work, said torque measuring means including a link pivotally connected to said one arm and having slide-guide engagement with the other arm, means carried by said link for adjustably limiting the extent of rotation movement of said arms away from each other, a stop member carried by said link between said arms, a spring associated with said link and confined between said stop member and the slidably-engaged portion of said other arm, and mechanism connected to said link and adapted to measure in terms of pressure the extent of relative rotation of said arms toward each other and the extent of compression of said spring when force or torque is applied to said other arm through said one arm to the work.

9. A torque measuring wrench comprising a pair of arms rotatably connected together at one end thereof, one of said arms having provision for rigid engagement with the work, and torque measuring means connecting said arms in such a way that the tightening force or torque is applied to the work through the other of said arms through said means and said one arm, said torque measuring means comprising a link and spring mechanism adapted to limit the extent of relative movement of said arms away from each other and also to yieldably oppose relative rotation of said arms toward each other, and means for measuring the extent of relative rotation of said arms toward each other and extent of compression of said spring in terms of pressure, including a rack member fixedly carried by said link, a pinion operatively engaged with said rack, a gage hand connected to and rotatably moved by said pinion, and a scale member calibrated in terms of pressure with respect to which said gage hand is moved.

10. A torque measuring wrench comprising a pair of arms rotatably connected together at one end thereof, and torque measuring means further connecting said arms together so that force applied to one is transmitted to the other and to the work through said torque measuring means, said torque measuring means including a slide bearing member on one of said arms, a link member pivotally connected at one end to the other of said arms and slidably engaged with said slide bearing member, an adjustable stop member on the other end of said link member and adapted to engage said slide bearing for adjustably limiting the extent of relative rotation of said arms away from each other, a spring member associated with said link member and yieldably opposing rotative movement of said arms toward each other, and indicating means carried by the arm having said slide bearing member for registering, in terms of pressure, the extent of relative rotation of said arms toward each other, said indicating means including a movable indicator connected to said link and movable by and as said link is moved by relative movement of said arms.

HERMAN W. ZIMMERMAN.